US006155925A

United States Patent [19]

Giobbi et al.

[11] Patent Number: 6,155,925

[45] Date of Patent: Dec. 5, 2000

[54] BONUS GAME FOR GAMING MACHINE WITH PAYOUT PERCENTAGE VARYING AS FUNCTION OF WAGER

[75] Inventors: John J. Giobbi, Crown Point, Ind.; Joel R. Jaffe, Evanston, Ill.

[73] Assignee: WMS Gaming Inc., Chicago, Ill.

[21] Appl. No.: 09/373,151

[22] Filed: Aug. 12, 1999

[51] Int. Cl.[7] ...................................................... A63F 13/00

[52] U.S. Cl. ...................... 463/20; 273/138.1; 273/143 R

[58] Field of Search ................................. 463/20, 17, 21, 463/29; 273/143 R, 138.1, 138.2, 138 R, 138 A

[56] References Cited

U.S. PATENT DOCUMENTS

| | | | |
|---|---|---|---|
| 4,624,459 | 11/1986 | Kaufman . | |
| 4,837,728 | 6/1989 | Barrie et al. . | |
| 4,991,848 | 2/1991 | Greenwood et al. . | |
| 5,123,649 | 6/1992 | Tiberio . | |
| 5,342,049 | 8/1994 | Wichinsky et al. . | |
| 5,494,287 | 2/1996 | Manz . | |
| 5,542,669 | 8/1996 | Charron et al. . | |
| 5,544,892 | 8/1996 | Breeding . | |
| 5,570,885 | 11/1996 | Ornstein . | |
| 5,718,431 | 2/1998 | Ornstein . | |
| 5,743,800 | 4/1998 | Huard et al. . | |
| 5,823,874 | 10/1998 | Adams . | |
| 5,848,932 | 12/1998 | Adams . | |
| 5,851,148 | 12/1998 | Brune et al. . | |
| 5,890,962 | 4/1999 | Takemoto | 463/20 |
| 5,951,397 | 9/1999 | Dickson | 463/36 |
| 5,976,015 | 11/1999 | Seelig et al. | 463/6 |
| 5,989,121 | 11/1999 | Sakamoto | 463/20 |
| 5,997,400 | 12/1999 | Seelig et al. | 463/6 |

FOREIGN PATENT DOCUMENTS

| | | |
|---|---|---|
| 2 072 395 | 9/1981 | United Kingdom . |
| 2 152 262 | 7/1985 | United Kingdom . |
| 2 181 589 | 4/1987 | United Kingdom . |
| 2 204 436 | 11/1988 | United Kingdom . |
| 2 262 642 | 6/1993 | United Kingdom . |

OTHER PUBLICATIONS

Strow, David; "Anchor Chief fears 'Strike It Rich' May Sour Players," *Las Vegas Sun* (internet), Aug. 16, 1999, 4 pp.

*Primary Examiner*—Jeanette Chapman
*Assistant Examiner*—D Collins
*Attorney, Agent, or Firm*—Jenkens & Gilchrist

[57] ABSTRACT

A gaming machine for playing a basic game and bonus game is set forth. The basic game is generated by a processor in response to a wager amount selected in multiples, called credits, of a minimum wager up to a maximum wager. The basic game includes a basic game pay schedule and at least one start-bonus outcome. The bonus game is entered upon the occurrence of a start-bonus outcome in the basic game. The bonus game has a bonus game payout percentage that is variable with the wager amount such that the bonus game payout percentage changes in response to variations in the wager amount.

27 Claims, 9 Drawing Sheets

*Fig. 3*

| WIN COMB | | | | | #PER REEL | | | | | # HITS | PAY |
|---|---|---|---|---|---|---|---|---|---|---|---|
| FG | FG | FG | FG | FG | 1 | 1 | 1 | 1 | 1 | 1 | 2500 |
| FG | FG | FG | FG | | 1 | 1 | 1 | 1 | 20 | 20 | 800 |
| FG | FG | FG | | | 1 | 1 | 1 | 20 | 24 | 480 | 100 |
| FG | FG | | | | 1 | 1 | 21 | 24 | 24 | 12096 | 20 |
| FG | | | | | 1 | 19 | 24 | 24 | 24 | 262656 | 2 |
| FB | FB | FB | FB | FB | 2 | 4 | 2 | 2 | 2 | 63 | 1000 |
| FB | FB | FB | FB | | 2 | 4 | 2 | 2 | 22 | 682 | 200 |
| FB | FB | FB | | | 2 | 4 | 2 | 22 | 24 | 7920 | 50 |
| FB | FB | | | | 2 | 4 | 22 | 24 | 24 | 88704 | 10 |
| FB | | | | | 1 | 20 | 24 | 24 | 24 | 276480 | 2 |
| FS | FS | FS | FS | FS | 2 | 2 | 2 | 3 | 3 | 71 | 500 |
| FS | FS | FS | FS | | 2 | 2 | 2 | 3 | 21 | 483 | 100 |
| FS | FS | FS | | | 2 | 2 | 2 | 21 | 24 | 3528 | 25 |
| FS | FS | | | | 2 | 2 | 22 | 24 | 24 | 38016 | 5 |
| FS | | | | | 1 | 22 | 24 | 24 | 24 | 304128 | 2 |
| BL | BL | BL | BL | BL | 2 | 4 | 3 | 3 | 2 | 144 | 250 |
| BL | BL | BL | BL | | 2 | 4 | 3 | 3 | 22 | 1584 | 100 |
| BL | BL | BL | | | 2 | 4 | 3 | 21 | 24 | 12096 | 25 |
| ML | ML | ML | ML | ML | 3 | 3 | 3 | 4 | 3 | 324 | 200 |
| ML | ML | ML | ML | | 3 | 3 | 3 | 4 | 21 | 2268 | 80 |
| ML | ML | ML | | | 3 | 3 | 3 | 20 | 24 | 12960 | 20 |
| PL | PL | PL | PL | PL | 4 | 2 | 4 | 4 | 5 | 640 | 150 |
| PL | PL | PL | PL | PL | 4 | 2 | 4 | 4 | 19 | 2432 | 60 |
| PL | PL | PL | PL | PL | 4 | 2 | 4 | 20 | 24 | 15360 | 15 |
| OR | OR | OR | OR | OR | 3 | 4 | 4 | 4 | 5 | 960 | 100 |
| OR | OR | OR | OR | | 3 | 4 | 4 | 4 | 19 | 3648 | 40 |
| OR | OR | OR | | | 3 | 4 | 4 | 20 | 24 | 23040 | 10 |
| CH | CH | CH | CH | CH | 6 | 3 | 4 | 4 | 4 | 1152 | 50 |
| CH | CH | CH | CH | | 6 | 3 | 4 | 4 | 20 | 5760 | 20 |
| CH | CH | CH | | | 6 | 3 | 4 | 20 | 24 | 34560 | 5 |
| 3 WM LURES | | | | | 3 | 3 | 3 | 24 | 24 | 15552 | 3 |
| 3 FISH LURES | | | | | 3 | 3 | 3 | 24 | 24 | 15552 | 3 |
| 5 FLY LURES | | | | | 3 | 3 | 3 | 3 | 3 | 243 | 100 |
| 4 FLY LURES | | | | | 3 | 3 | 3 | 3 | 21 | 1701 | 25 |
| 3 FLY LURES | | | | | 3 | 3 | 3 | 21 | 24 | 13608 | 3 |
| 3 FLY LURES | | | | | 21 | 3 | 3 | 3 | 21 | 11907 | 3 |
| 3 FLY LURES | | | | | 24 | 21 | 3 | 3 | 3 | 13608 | 3 |
| TOTAL | | | | | 24 | 24 | 24 | 24 | 24 | 1186128 | 202419 |

*Fig. 4*

| WIN COMB | | | | | T PAY | PROB. | EV |
|---|---|---|---|---|---|---|---|
| FG | FG | FG | FG | FG | 2500 | 1.26E-07 | 0.000314 |
| FG | FG | FG | FG | | 10000 | 2.51E-06 | 0.001256 |
| FG | FG | FG | | | 48000 | 2.51E-05 | 0.006028 |
| FG | FG | | | | 241920 | 0.001519 | 0.030382 |
| FG | | | | | 525312 | 0.032986 | 0.065972 |
| FB | FB | FB | FB | FB | 63000 | 7.91E-06 | 0.007912 |
| FB | FB | FB | FB | | 136400 | 8.57E-05 | 0.01713 |
| FB | FB | FB | | | 396000 | 0.000998 | 0.049732 |
| FB | FB | | | | 887040 | 0.01114 | 0.1114 |
| FB | | | | | 552960 | 0.034722 | 0.069444 |
| FS | FS | FS | FS | FS | 35500 | 8.92E-06 | 0.004458 |
| FS | FS | FS | FS | | 48300 | 6.07E-05 | 0.006066 |
| FS | FS | FS | | | 88200 | 0.000443 | 0.011077 |
| FS | FS | | | | 190080 | 0.004774 | 0.023872 |
| FS | | | | | 608256 | 0.038194 | 0.076389 |
| BL | BL | BL | BL | BL | 36000 | 1.81E-05 | 0.004521 |
| BL | BL | BL | BL | | 158400 | 0.000199 | 0.019893 |
| BL | BL | BL | | | 302400 | 0.001519 | 0.037977 |
| ML | ML | ML | ML | ML | 64800 | 4.07E-05 | 0.008138 |
| ML | ML | ML | ML | | 181440 | 0.000285 | 0.022786 |
| ML | ML | ML | | | 259200 | 0.001628 | 0.032552 |
| PL | PL | PL | PL | PL | 96000 | 8.04E-05 | 0.012056 |
| PL | PL | PL | PL | PL | 145920 | 0.000305 | 0.018326 |
| PL | PL | PL | PL | PL | 230400 | 0.001929 | 0.028935 |
| OR | OR | OR | OR | OR | 96000 | 0.000121 | 0.012056 |
| OR | OR | OR | OR | | 145920 | 0.000458 | 0.018326 |
| OR | OR | OR | | | 230400 | 0.002894 | 0.028935 |
| CH | CH | CH | CH | CH | 57600 | 0.000145 | 0.007234 |
| CH | CH | CH | CH | | 115200 | 0.000723 | 0.014468 |
| CH | CH | CH | | | 172800 | 0.00434 | 0.021701 |
| 3 WM LURES | | | | | 46656 | 0.001953 | 0.005859 |
| 3 FISH LURES | | | | | 46656 | 0.001953 | 0.005859 |
| 5 FLY LURES | | | | | 24300 | 3.05E-05 | 0.003052 |
| 4 FLY LURES | | | | | 42525 | 0.000214 | 0.005341 |
| 3 FLY LURES | | | | | 40824 | 0.001709 | 0.005127 |
| 3 FLY LURES | | | | | 36721 | 0.001495 | 0.004486 |
| 3 FLY LURES | | | | | 40824 | 0.001709 | 0.005127 |
| TOTAL | | | | | 6445979 | 0.9277% | 0.809529 |

Fig. 6a

| 1-5 CREDITS | | | | |
|---|---|---|---|---|
| BONUS WIN | PAY | WEIGHT | PROB. | TOT. PAY |
| TIN CAN | 5 | 1,666 | 0.23581 | 8,330 |
| SMALL FISH | 10 | 2,777 | 0.393064 | 27,770 |
| MEDIUM FISH | 15 | 2,222 | 0.314508 | 33,330 |
| MEDIUM FISH | 20 | 400 | 0.056617 | 8,000 |
| BONUS GAME % | | 10.17% | | |
| TOTAL GAME % | | 91.12% | | |

Fig. 6b

| 6-10 CREDITS | | | | |
|---|---|---|---|---|
| BONUS WIN | PAY | WEIGHT | PROB. | TOT. PAY |
| TIN CAN | 5 | 1,666 | 0.220225 | 8,330 |
| SMALL FISH | 10 | 2,777 | 0.367085 | 27,770 |
| MEDIUM FISH | 15 | 2,222 | 0.293721 | 33,330 |
| MEDIUM FISH | 20 | 400 | 0.052875 | 8,000 |
| LARGE FISH | 25 | 500 | 0.066094 | 12,500 |
| BONUS GAME % | | 11.03% | | |
| TOTAL GAME % | | 91.98% | | |

Fig. 6c

| 11-15 CREDITS | | | | |
|---|---|---|---|---|
| BONUS WIN | PAY | WEIGHT | PROB. | TOT. PAY |
| TIN CAN | 5 | 1,666 | 0.214552 | 8,330 |
| SMALL FISH | 10 | 2,777 | 0.35763 | 27,770 |
| MEDIUM FISH | 15 | 2,222 | 0.286156 | 33,330 |
| MEDIUM FISH | 20 | 400 | 0.051513 | 8,000 |
| LARGE FISH | 25 | 500 | 0.064392 | 12,500 |
| VERY LARGE FISH | 50 | 200 | 0.025757 | 10,000 |
| BONUS GAME % | | 11.94% | | |
| TOTAL GAME % | | 92.89% | | |

Fig. 6d

| 16-20 CREDITS | | | | |
|---|---|---|---|---|
| BONUS WIN | PAY | WEIGHT | PROB. | TOT. PAY |
| TIN CAN | 5 | 1,666 | 0.211825 | 8,330 |
| SMALL FISH | 10 | 2,777 | 0.353083 | 27,770 |
| MEDIUM FISH | 15 | 2,222 | 0.282517 | 33,330 |
| MEDIUM FISH | 20 | 400 | 0.050858 | 8,000 |
| LARGE FISH | 25 | 500 | 0.063573 | 12,500 |
| VERY LARGE FISH | 50 | 200 | 0.025429 | 10,000 |
| HUGE FISH | 75 | 100 | 0.012715 | 7,500 |
| BONUS GAME % | | 12.67% | | |
| TOTAL GAME % | | 93.63% | | |

Fig. 6e

| 21-25 CREDITS | | | | |
|---|---|---|---|---|
| BONUS WIN | PAY | WEIGHT | PROB. | TOT. PAY |
| TIN CAN | 5 | 1,666 | 0.209692 | 8,330 |
| SMALL FISH | 10 | 2,777 | 0.349528 | 27,770 |
| MEDIUM FISH | 15 | 2,222 | 0.279673 | 33,330 |
| MEDIUM FISH | 20 | 400 | 0.050346 | 8,000 |
| LARGE FISH | 25 | 500 | 0.062933 | 12,500 |
| VERY LARGE FISH | 50 | 200 | 0.025173 | 10,000 |
| HUGE FISH | 75 | 100 | 0.012587 | 7,500 |
| GIGANTIC FISH | 150 | 80 | 0.010069 | 12,000 |
| BONUS GAME % | | 13.95% | | |
| TOTAL GAME % | | 94.90% | | |

Fig. 8a

| 1-5 CREDITS | | | | |
|---|---|---|---|---|
| BONUS WIN | PAY | WEIGHT | PROB. | TOT. PAY |
| TIN CAN | 5 | 1,666 | 0.216899 | 8,330 |
| SMALL FISH | 10 | 2,777 | 0.361541 | 27,770 |
| MEDIUM FISH | 15 | 2,222 | 0.289285 | 33,330 |
| MEDIUM FISH | 20 | 800 | 0.104153 | 16,000 |
| LARGE FISH | 25 | 200 | 0.026038 | 5,000 |
| VERY LARGE FISH | 50 | 10 | 0.001302 | 500 |
| HUGE FISH | 75 | 5 | 0.000651 | 375 |
| GIGANTIC FISH | 150 | 1 | 0.00013 | 150 |
| BONUS GAME % | | 11.05% | | |
| TOTAL GAME % | | 92.00% | | |

Fig. 8b

| 6-10 CREDITS | | | | |
|---|---|---|---|---|
| BONUS WIN | PAY | WEIGHT | PROB. | TOT. PAY |
| TIN CAN | 5 | 1,666 | 0.200554 | 8,330 |
| SMALL FISH | 10 | 2,777 | 0.334296 | 27,770 |
| MEDIUM FISH | 15 | 2,222 | 0.267485 | 33,330 |
| MEDIUM FISH | 20 | 1,200 | 0.144456 | 24,000 |
| LARGE FISH | 25 | 400 | 0.048152 | 10,000 |
| VERY LARGE FISH | 50 | 30 | 0.003611 | 1,500 |
| HUGE FISH | 75 | 10 | 0.001204 | 750 |
| GIGANTIC FISH | 150 | 2 | 0.000241 | 300 |
| BONUS GAME % | | 11.84% | | |
| TOTAL GAME % | | 92.79% | | |

Fig. 8c

| 11-15 CREDITS | | | | |
|---|---|---|---|---|
| BONUS WIN | PAY | WEIGHT | PROB. | TOT. PAY |
| TIN CAN | 5 | 1,666 | 0.188462 | 8,330 |
| SMALL FISH | 10 | 2,777 | 0.31414 | 27,770 |
| MEDIUM FISH | 15 | 2,222 | 0.251357 | 33,330 |
| MEDIUM FISH | 20 | 1,600 | 0.180995 | 32,000 |
| LARGE FISH | 25 | 500 | 0.056561 | 12,500 |
| VERY LARGE FISH | 50 | 50 | 0.005656 | 2,500 |
| HUGE FISH | 75 | 20 | 0.002262 | 1,500 |
| GIGANTIC FISH | 150 | 5 | 0.000566 | 750 |
| BONUS GAME % | | 12.46% | | |
| TOTAL GAME % | | 93.41% | | |

Fig. 8d

| 16-20 CREDITS | | | | |
|---|---|---|---|---|
| BONUS WIN | PAY | WEIGHT | PROB. | TOT. PAY |
| TIN CAN | 5 | 1,666 | 0.180401 | 8,330 |
| SMALL FISH | 10 | 2,777 | 0.300704 | 27,770 |
| MEDIUM FISH | 15 | 2,222 | 0.240606 | 33,330 |
| MEDIUM FISH | 20 | 1,600 | 0.173254 | 32,000 |
| LARGE FISH | 25 | 800 | 0.086627 | 20,000 |
| VERY LARGE FISH | 50 | 100 | 0.010828 | 5,000 |
| HUGE FISH | 75 | 50 | 0.005414 | 3,750 |
| GIGANTIC FISH | 150 | 20 | 0.002166 | 3,000 |
| BONUS GAME % | | 13.38% | | |
| TOTAL GAME % | | 94.33% | | |

Fig. 8e

| 21-25 CREDITS | | | | |
|---|---|---|---|---|
| BONUS WIN | PAY | WEIGHT | PROB. | TOT. PAY |
| TIN CAN | 5 | 1,666 | 0.174982 | 8,330 |
| SMALL FISH | 10 | 2,777 | 0.291671 | 27,770 |
| MEDIUM FISH | 15 | 2,222 | 0.233379 | 33,330 |
| MEDIUM FISH | 20 | 1,600 | 0.16805 | 32,000 |
| LARGE FISH | 25 | 1,000 | 0.105031 | 25,500 |
| VERY LARGE FISH | 50 | 150 | 0.015755 | 7,500 |
| HUGE FISH | 75 | 76 | 0.007982 | 5,700 |
| GIGANTIC FISH | 150 | 30 | 0.003151 | 4,500 |
| BONUS GAME % | | 14.04% | | |
| TOTAL GAME % | | 95.00% | | |

Fig. 9a

| 1-4 CREDITS | | | | |
|---|---|---|---|---|
| BONUS WIN | PAY | WEIGHT | PROB. | TOT. PAY |
| TIN CAN | 3 | 2,660 | 0.267686 | 7,980 |
| SMALL FISH | 5 | 2,777 | 0.279461 | 13,885 |
| MEDIUM FISH | 10 | 1,522 | 0.150951 | 15,000 |
| MEDIUM FISH | 15 | 1,000 | 0.100634 | 15,000 |
| LARGE FISH | 20 | 1,000 | 0.100634 | 20,000 |
| VERY LARGE FISH | 25 | 1,000 | 0.100634 | 25,000 |
| BONUS GAME % | | 9.04% | | |
| TOTAL GAME % | | 90.00% | | |

Fig. 9b

| 5-7 CREDITS | | | | |
|---|---|---|---|---|
| BONUS WIN | PAY | WEIGHT | PROB. | TOT. PAY |
| TIN CAN | 3 | 2,660 | 0.267686 | 7,980 |
| SMALL FISH | 5 | 2,777 | 0.279461 | 13,885 |
| MEDIUM FISH | 10 | 1,500 | 0.150951 | 15,000 |
| MEDIUM FISH | 15 | 1,000 | 0.100634 | 15,000 |
| LARGE FISH | 20 | 1,000 | 0.100634 | 20,000 |
| VERY LARGE FISH | 35 | 1,000 | 0.100634 | 35,000 |
| BONUS GAME % | | 9.98% | | |
| TOTAL GAME % | | 90.93% | | |

Fig. 9c

| 8-11 CREDITS | | | | |
|---|---|---|---|---|
| BONUS WIN | PAY | WEIGHT | PROB. | TOT. PAY |
| TIN CAN | 3 | 2,660 | 0.267686 | 7,980 |
| SMALL FISH | 5 | 2,777 | 0.279461 | 13,885 |
| MEDIUM FISH | 10 | 1,500 | 0.150951 | 15,000 |
| MEDIUM FISH | 15 | 1,000 | 0.100634 | 15,000 |
| LARGE FISH | 20 | 1,000 | 0.100634 | 20,000 |
| VERY LARGE FISH | 40 | 1,000 | 0.100634 | 40,000 |
| BONUS GAME % | | 10.44% | | |
| TOTAL GAME % | | 91.40% | | |

Fig. 9d

| 12-14 CREDITS | | | | |
|---|---|---|---|---|
| BONUS WIN | PAY | WEIGHT | PROB. | TOT. PAY |
| TIN CAN | 3 | 2,660 | 0.267686 | 7,980 |
| SMALL FISH | 5 | 2,777 | 0.279461 | 13,885 |
| MEDIUM FISH | 10 | 1,500 | 0.150951 | 15,000 |
| MEDIUM FISH | 15 | 1,000 | 0.100634 | 15,000 |
| LARGE FISH | 20 | 1,000 | 0.100634 | 20,000 |
| VERY LARGE FISH | 50 | 1,000 | 0.100634 | 50,000 |
| BONUS GAME % | | 11.38% | | |
| TOTAL GAME % | | 92.33% | | |

Fig. 9e

| 15-19 CREDITS | | | | |
|---|---|---|---|---|
| BONUS WIN | PAY | WEIGHT | PROB. | TOT. PAY |
| TIN CAN | 3 | 2,660 | 0.267686 | 7,980 |
| SMALL FISH | 5 | 2,777 | 0.279461 | 13,885 |
| MEDIUM FISH | 10 | 1,500 | 0.150951 | 15,000 |
| MEDIUM FISH | 15 | 1,000 | 0.100634 | 15,000 |
| LARGE FISH | 20 | 1,000 | 0.100634 | 20,000 |
| VERY LARGE FISH | 60 | 1,000 | 0.100634 | 60,000 |
| BONUS GAME % | | 12.31% | | |
| TOTAL GAME % | | 93.26% | | |

Fig. 9f

| 20-24 CREDITS | | | | |
|---|---|---|---|---|
| BONUS WIN | PAY | WEIGHT | PROB. | TOT. PAY |
| TIN CAN | 3 | 2,660 | 0.267686 | 7,980 |
| SMALL FISH | 5 | 2,777 | 0.279461 | 13,885 |
| MEDIUM FISH | 10 | 1,500 | 0.150951 | 15,000 |
| MEDIUM FISH | 15 | 1,000 | 0.100634 | 15,000 |
| LARGE FISH | 20 | 1,000 | 0.100634 | 20,000 |
| VERY LARGE FISH | 70 | 1,000 | 0.100634 | 70,000 |
| BONUS GAME % | | 13.24% | | |
| TOTAL GAME % | | 94.20% | | |

Fig. 9g

| 25 CREDITS | | | | |
|---|---|---|---|---|
| BONUS WIN | PAY | WEIGHT | PROB. | TOT. PAY |
| TIN CAN | 3 | 2,660 | 0.267686 | 7,980 |
| SMALL FISH | 5 | 2,777 | 0.279461 | 13,885 |
| MEDIUM FISH | 10 | 1,500 | 0.150951 | 15,000 |
| MEDIUM FISH | 15 | 1,000 | 0.100634 | 15,000 |
| LARGE FISH | 20 | 1,000 | 0.100634 | 20,000 |
| VERY LARGE FISH | 79 | 1,000 | 0.100634 | 79,000 |
| BONUS GAME % | | 14.09% | | |
| TOTAL GAME % | | 95.04% | | |

BONUS GAME FOR GAMING MACHINE WITH PAYOUT PERCENTAGE VARYING AS FUNCTION OF WAGER

FIELD OF THE INVENTION

The present invention relates generally to gaming machines and, more particularly, to a bonus game for a gaming machine with adjustable payout varying as a function of wager.

BACKGROUND OF THE INVENTION

Gaming machines, such as slot machines, video poker machines and the like, have been a cornerstone of the gaming industry for several years. In a typical reel-type slot machine, a payout of coin(s) or credit(s) is made to a player whenever certain combinations of symbols are displayed on the reels relative to a payline. To accommodate various players, each machine will accept a certain minimum wager amount per activation of the reels. For example, a player willing to bet larger amounts will chose a machine having $1.00 or $5.00 as its minimum wager amount instead of a $0.05 or $0.25 machine. Also, casino operators will adjust the total game payout percentage up or down based on the profitability that the operator of the gaming machine desires and whatever regulations are imposed upon the operator by the gaming authority that regulates the use of the gaming machine. Generally, the operator will set the payout percentage for each machine based on the minimum wager amount such that the payout percentages increase as the minimum wager amount increases. For example, the payout percentage of a $5.00 machine will be higher than the nickel machine.

Generally, the popularity of such gaming machines with players is dependent on the intrinsic entertainment value of the machine relative to other available gaming options and the likelihood (or perceived likelihood) of winning money at the machine. One concept which has been successfully employed to enhance the entertainment value of a game is the concept of a secondary or bonus game which may be played in conjunction with a basic game. The bonus game may comprise any type of game, either similar to or completely different from the basic game, which is entered upon the occurrence of a selected event or outcome of the basic game. The bonus game concept is the subject of U.S. patent application Ser. No. 08/835,840 [hereinafter "the '840 application"], filed Apr. 23, 1997, assigned to the assignee of the present invention and incorporated herein by reference. The '840 application discloses an embodiment wherein the basic game is a reel-type slot machine and the bonus game is a simulated reel-type slot machine implemented on a dot-matrix display. The bonus game is entered upon the appearance of a special symbol combination on the reels of the slot machine in the basic game. In the bonus game, the probability of winning combinations appearing on the reels, or the hit-rate, is much greater than that of the basic game. The player is permitted to keep playing and accumulating winnings from the bonus game until a losing trial occurs. Such a bonus game produces a significantly higher level of player excitement than the basic game because it provides a greater expectation of winning than the basic game and is accompanied by more attractive or unusual video displays and/or audio.

One feature in reel-type slot machines which has been successfully employed to enhance the perceived payoff value of a game is that of multiple paylines, scatter pay paylines or unusually-shaped paylines. Such games allow the player to select the number of paylines, vary the amount of credits (wager amount) bet on each line, and award regular payouts when winning combinations occur. These machines afford more opportunities to win with each activation of the reels. When placing bets on multiple paylines, the player increases his chances for a winning combination while at the same time betting more money.

While most players are likely to be attracted to the most entertaining and exciting of the machines, shrewd players will quickly recognize machines which present or will be perceived to present greater payoff opportunities relative to other available gaming options. Since a gaming machine with multiple paylines accepts a range of wager amounts from a minimum wager amount to a maximum wager amount, setting a machine to any one payout percentage would disadvantage a player betting a certain amount on a nickel machine relative to the same amount bet on a dollar machine which has a higher payout percentage. Some players will recognize the lower return and only play machines with the higher payout percentage. Also, other players unwilling to wager larger amounts associated with the machines having higher payout percentages will altogether turn away from playing the machines with lower payout percentages as well.

Since a greater payoff opportunity associated with a particular machine will attract frequent play and thereby produce greater revenues for the casino player, there is a need to develop new types of such games that will not discourage players from playing multiple coins or credits on any given machine. The present invention is directed to satisfying this need.

SUMMARY OF THE INVENTION

In accordance with one embodiment of the present invention, a gaming machine includes a basic game controlled by a processor in response to a wager amount. The wager amount is selectable in multiples called credits of a minimum wager to a maximum wager. The basic game has a basic game payout percentage and at least one start-bonus outcome. The gaming machine also includes a bonus game activated by the start-bonus outcome which causes the processor to shift operation from a basic game to a bonus game. The bonus game has a bonus game payout percentage that is variable with the wager amount such that the bonus game payout percentage per credit changes in response to variations in the wager amount.

BRIEF DESCRIPTION OF THE DRAWINGS

The foregoing and other advantages of the invention will become apparent upon reading the following detailed description and upon reference to the drawings in which:

FIG. 3 is a table for various symbol combinations which may occur in a reel-type basic game;

FIG. 4 is a pay schedule corresponding to the symbol combinations with one credit played;

Figure 7:
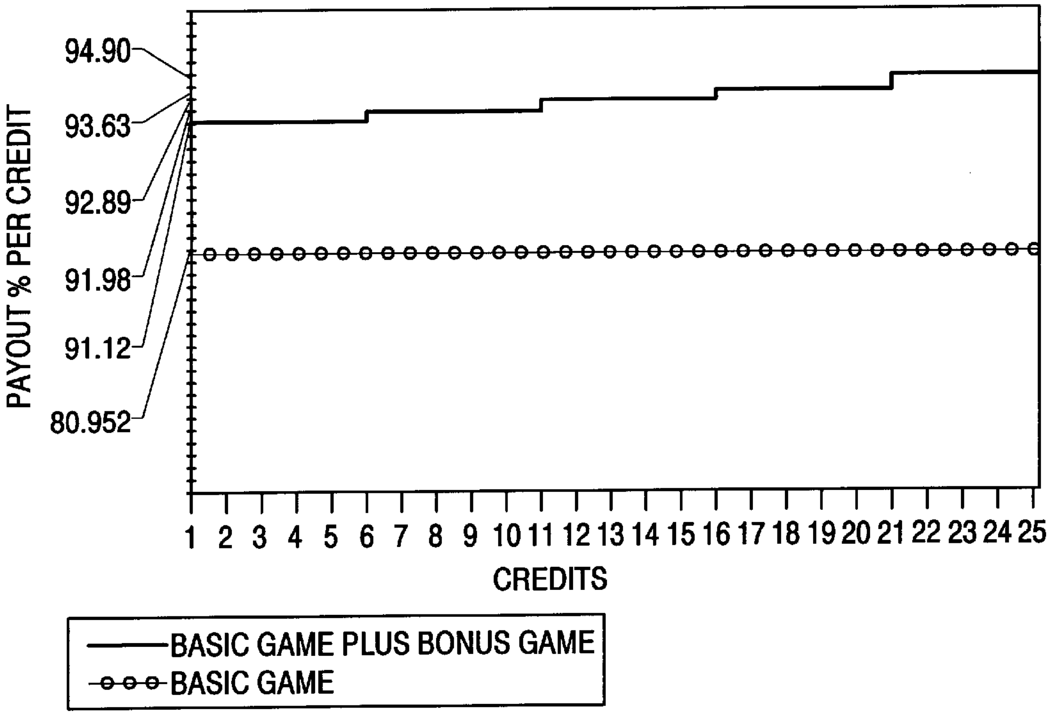
Figure 10:
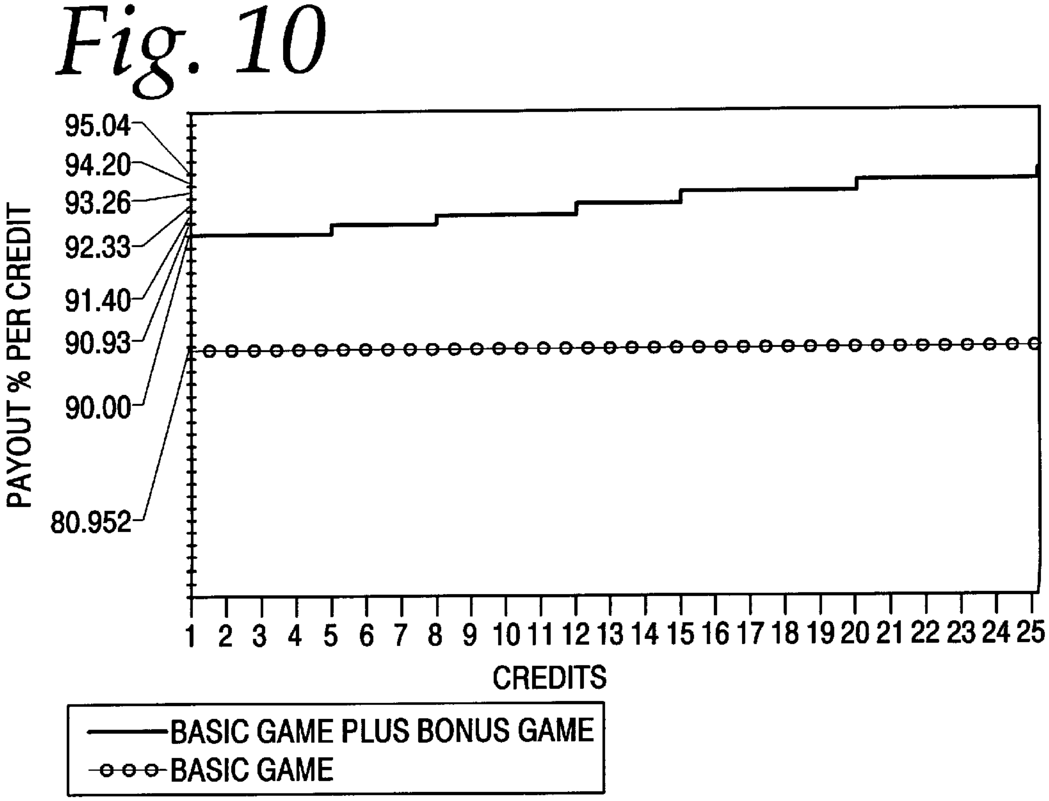

FIG. **6*a*** is a pay schedule for various winning bonus game outcomes corresponding to 1–5 credits played;

FIG. **6*b*** is a pay schedule for various winning bonus game outcomes corresponding to 6–10 credits played;

FIG. 6*c* is a pay schedule for various winning bonus game outcomes corresponding to 11–15 credits played;

FIG. 6*d* is a pay schedule for various winning bonus game outcomes corresponding to 16–20 credits played;

FIG. 6*e* is a pay schedule for various winning bonus game outcomes corresponding to 21–25 credits played;

FIG. 7 is a plot of a basic game payout percentage per credit and the total game payout percentage per credit versus the number of credits;

FIG. 8*a* is a pay schedule for various winning bonus game outcomes corresponding to 1–5 credits played;

FIG. 8*b* is a pay schedule for various winning bonus game outcomes corresponding to 6–10 credits played;

FIG. 8*c* is a pay schedule for various winning bonus game outcomes corresponding to 11–15 credits played;

FIG. 8*d* is a pay schedule for various winning bonus game outcomes corresponding to 16–20 credits played;

FIG. 8*e* is a pay schedule for various winning bonus game outcomes corresponding to 21–25 credits played;

FIG. 9*a* is a pay schedule for various winning bonus game outcomes corresponding to 1–4 credits played;

FIG. 9*b* is a pay schedule for various winning bonus game outcomes corresponding to 5–7 credits played;

FIG. 9*c* is a pay schedule for various winning bonus game outcomes corresponding to 8–11 credits played;

FIG. 9*d* is a pay schedule for various winning bonus game outcomes corresponding to 12–14 credits played;

FIG. 9*e* is a pay schedule for various winning bonus game outcomes corresponding to 15–19 credits played;

FIG. 9*f* is a pay schedule for various winning bonus game outcomes corresponding to 20–24 credits played;

FIG. 9*g* is a pay schedule for various winning bonus game outcomes corresponding to 25 credits played; and FIG. 10 is a plot of a basic game payout percentage per credit and the total game layout percentage per credit versus the number of credits.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Figure 1:
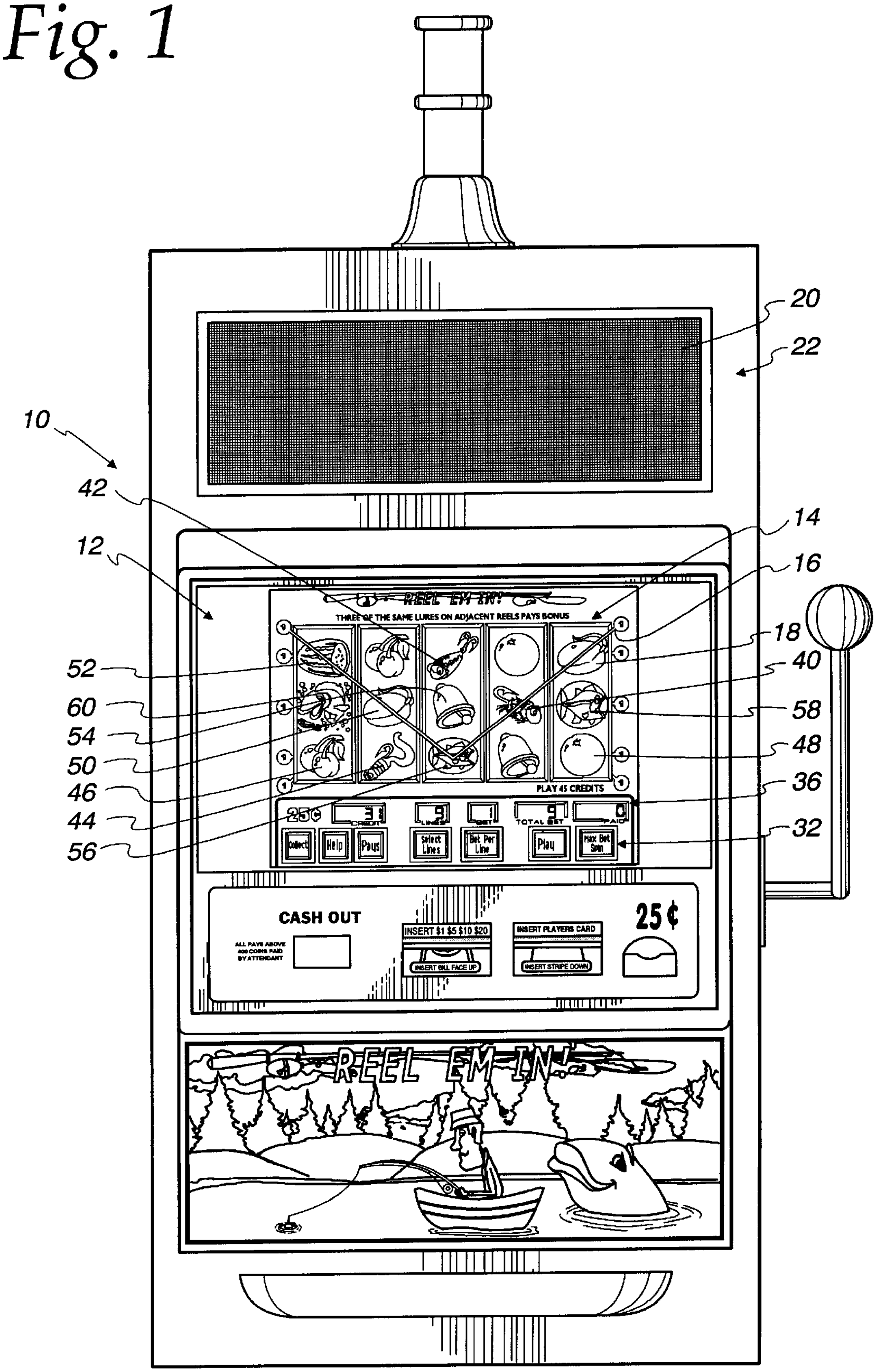
FIG. 1 is an illustration of a gaming machine having a video display on which the present invention may be implemented.

A representative example of a gaming machine 10, in this case, a reel-type slot machine which may be utilized to play both a basic game and a secondary or bonus game, is shown in FIG. 1. While, for the basic game, a five-reel slot machine is shown, the basic game is not intended to be limited to slot machines, rather it can include any myriad of other game types. The gaming machine 10 includes a display window 12 through which the player may observe spinning reels 14. Game play is initiated by inserting a number of coins or playing a number of credits on one or more paylines 16. A wager amount is selectable by the player in multiples called credits of a minimum wager up to a maximum wager. The credits are not limited to whole number multiples of the minimum wager amount. After activation of the paylines 16, the reels 14 are set in motion and a processor operates according to its game program to select a basic game outcome corresponding to a particular set of reel stop positions and, using technology well known in the art, causes each of the reels to stop at a pre-selected stop position. Reel symbols 18 graphically illustrate the reel stop position and indicate whether the stop position of the reels represents a winning game outcome. Winning basic game outcomes (e.g., symbol combinations resulting in payment of coins or credits) are identifiable to the player by a pay table (not shown) which is generally affixed to the slot machine. A winning game outcome occurs when the symbols appearing on the reels along a payline correspond to one of the winning combinations on the pay table.

Included among the plurality of basic game outcomes is at least one start-bonus outcome for starting play of a bonus game. A start-bonus outcome may be defined in any number of ways. For example, a start-bonus outcome occurs when a special start-bonus symbol or a special combination of symbols 18 appears on one or more of the reels 14 in any predetermined display position. The appearance of a start-bonus outcome causes the processor to shift operation from the basic game to a bonus game.

A video display 20 is provided for displaying the bonus game. The video display 20 may comprise a dot matrix, CRT, LED, LCD, electro-luminescent display or generally any type of video display known in the art. In the illustrated embodiment, the video display 20 is vertically disposed within an upper portion 22 of the gaming machine 10. It will be appreciated that the basic game need not comprise a spinning reel slot machine game as illustrated in FIG. 1, but may comprise virtually any type of game of chance or skill or combination of games having outcomes (e.g., start-bonus outcomes) which may trigger play of a bonus game on the video display. The basic game may itself be implemented on the video display 20 or a separate video display (not shown). The basic game may comprise a video poker or video blackjack game, for example. In embodiments where both the basic and bonus games are implemented in video, each game may be shown on the same video display.

Figure 2:
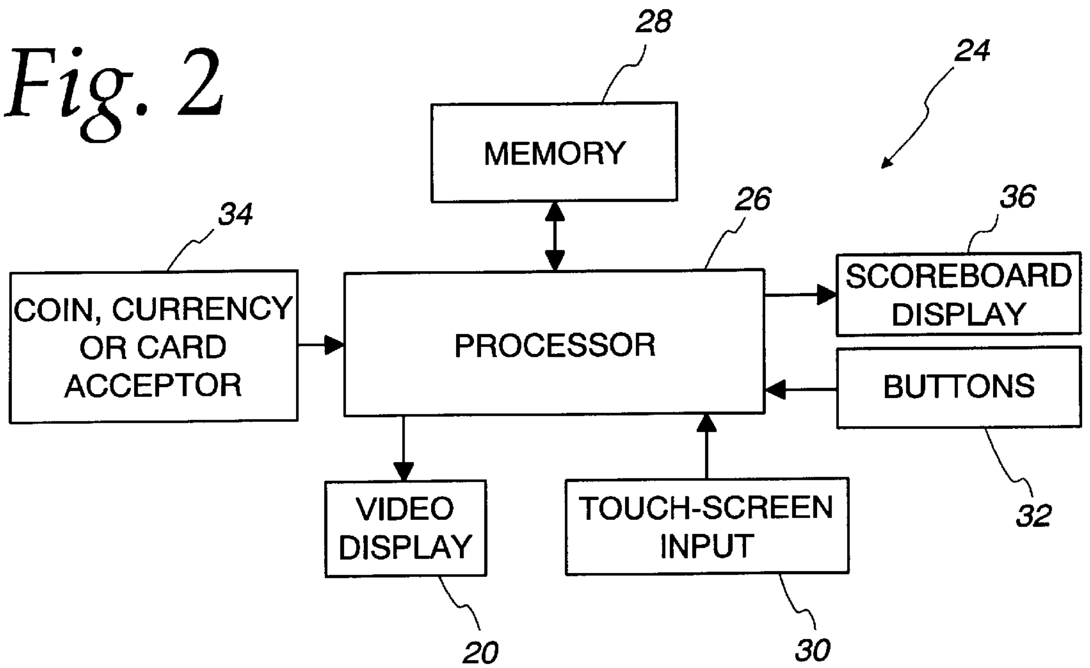
FIG. 2 is a block diagram of the gaming machine architecture.

A block diagram 24 of the gaming machine 10 is shown in FIG. 2. The gaming machine 10 is provided with a processor 26 and memory 28. The computer may be coupled to a number of peripheral devices such as a video display 20 possibly having a touch screen input 30 and/or buttons 32, keys or other user input devices. A coin. currency, or card acceptor device 34 permits a player to place wagers. A scoreboard display 36 or other display device provides an indication of the player's progress.

The number of credits awarded in the basic game for a win is generally controlled in relation to the odds that a particular combination will occur and the number of credits wagered or the wager amount. In accordance with the invention, the number of credits awarded for a particular winning combination of symbols is determined by a pay schedule. An example of a pay schedule for the basic game is shown in FIGS. 3 and 4. the pay schedule identifies mathematical probabilities and expected values in a basic game with 1-coin or credit played and only one payline activated.

In FIG. 3, the "WIN COMB" or "WIN COMBINATION" column identifies various winning basic game outcomes that may occur in the basic game. For example, the win combination of FG FG -- -- -- corresponds to the appearance of two gigantic fish symbols on any of the reels. As shown in FIG. 1, symbols include, a fly lure 40, a fish lure 42, a worm lure 44, a cherry (CH) 46, an orange (OR) 48, a plum (PL) 50, a mellon (ML) 52, a bell (BL) 54, a small fish (FS) 56, a big fish (FB) 58, and a gigantic fish (FG) 60.

The "#PER REEL" column in FIG. 3 indicates, respectively, the number(s) of reel positions on reels 14 that will support the various winning combinations for a one credit game. The "#HITS" column identifies, for each combination of symbols, the product of the five "#PER REEL" columns and represents the number(s) of times the winning combinations can occur, given the number(s) of reel positions of the various symbols 18 and the number of active paylines 16. Thus, for the FG FG FG -- -- symbol combination in a 1-credit game, the "#HITS" value is 480 (i.e., 1×1×1×20×24). The "TOTAL HITS" value (i.e. 1,186,128), at the bottom of the "#HITS" column, is the sum of the various "#HITS" values in a 1-credit game.

The "PAY" column of FIG. 3 lists the pay values of the respective winning outcomes for a 1-credit game. In FIG. 4, the "T PAY" or "TOTAL PAY" column lists, for each winning outcome, the product of the "#HITS" value and the "PAY" value. The FG FG FG -- -- combination, for example, having 480 hits each paying 100 credits, has a "TOTAL PAY" value of 48,000 credits. "Total Coins Paid" is the sum of the various "TOTAL PAY" amounts and equals 6,445,979 total credits for a 1-credit game.

Referring to FIG. 4, the "PROB" or "PROBABILITY" column indicates the various probabilities of hitting the respective winning combinations in a single spin. The "EV" column identifies the expected values of the respective winning outcomes, computed for each outcome by taking the product of the "PAY" value and the "PROBABILITY" value. Thus, for the FG -- -- -- -- combination, the expected value is 0.0659722 (2×0.032986). A "Payout Rate" or "Game Payout" of the basic game, identified at the bottom of the "EV" column, is computed by summing each of the expected values. Thus, for a 1-credit game, the payout rate is 0.809529, or the basic game has a basic game payout percentage of 80.9529%.

Modification of the pay schedule to reflect more than a 1-credit game may be easily accomplished by those skilled in the art. Accordingly, such modification will not be described in detail herein. Suffice it to say that if the 2-credit, 3-credit, 4-credit, and 5-credit games have, respectively 2, 3, 4 and 5 times active paylines, the "#HITS" and "TOTAL HITS" values will increase in proportion to the number of active paylines. For example, the "PAY" values for the FG FG FG -- -- combination will increase to 200, 300, 400 and 1,000 credits, respectively, depending on the numbers of credits played. The increased pay values for the FG FG FG -- -- combination causes the payout percentage to increase based on the number of credits played and causes the "Total Coins Paid" value to increase in a proportion greater than the number of active paylines.

There are various start-bonus game outcomes (e.g., special symbol combinations) which cause the processor 26 to shift operation from the basic game to a bonus game. One such combination, for example, is characterized by the display of three of the same lure symbols on adjacent reels, causing the processor to enter a bonus game. Special symbol combinations represent a start-bonus outcome because they cause the processor 26 to shift operation from the basic game to a bonus game. As shown in FIG. 4, the probability, for example, of achieving a start-bonus outcome is 0.0093, or a bonus play percentage is 0.93 percent. The start-bonus outcomes may or may not be identified to the player (e.g., on the pay table).

Figure 5:
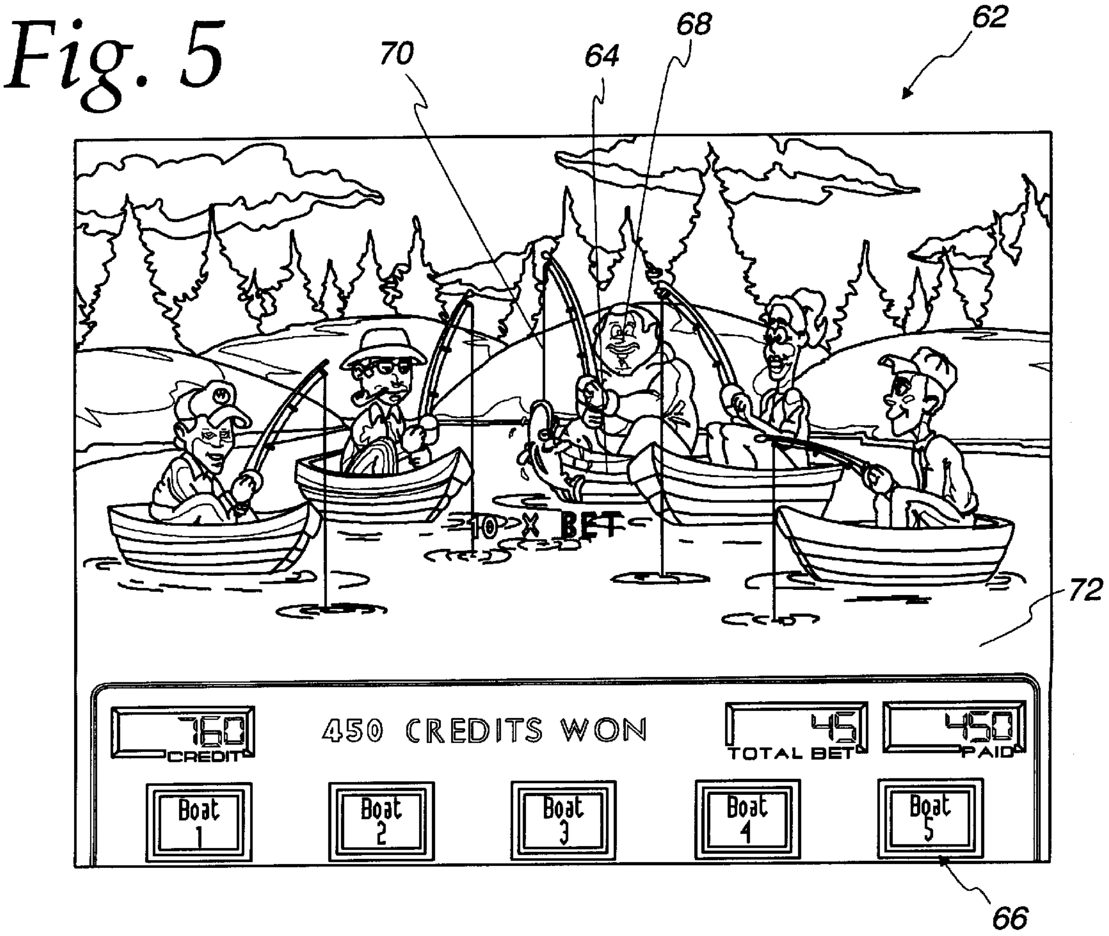
FIG. 5 is an illustration of a screen capture of the bonus game.

Referring now to FIG. 5, there is shown a screen capture 62 of a bonus game of one embodiment, wherein the bonus game simulates a fishing game wherein the player selects a lucky boat 64 either by touching the touch screen video display 20 or by pressing boat selection buttons 66. Then, a character 68 of the selected boat is animated by the processor 26 to cast a fishing line 70 into a pond 72 for a catch. What is reeled-in by the character and appears at the end of the fishing line is a bonus game outcome. From the plurality of possible bonus game outcomes, there are a plurality of winning bonus game outcomes. For example, winning bonus game outcomes may include medium fish, large fish, very large fish, huge fish, and gigantic fish; whereas, non-winning bonus game outcomes may include a tin can and an old tire. Each winning bonus game outcome has an associated pay value—an amount of coins or credits awarded to the player. For example, a bigger fish will have a larger associated pay value relative to a smaller fish.

The information provided in FIGS. 3 and 4 corresponds only to the basic game and does not factor in winning outcomes associated with the bonus game. The basic game payout percentage in addition to a bonus game payout percentage will determine the payout percentage of the basic game and bonus game combined, or a total game payout percentage.

A plurality of different bonus pay schedules is provided, each of which may be dynamically selected by the processor 26 during operation of the gaming machine 10. In one embodiment, an example of a set of bonus pay schedules of the type used in this gaming machine 10 from which the processor 26 will select one is shown in FIGS. 6*a*–6*e*. A single pay schedule is depicted in each figure. Each bonus pay schedule shows a "WEIGHT" column that indicates the weight distribution which represents the number of times the winning bonus game outcome can occur. The probability is shown in a "PROB" column which indicates the various probabilities of hitting the respective winning bonus game outcomes. The "PAY" column lists the pay values of the respective winning bonus game outcomes for a 1-credit game. The "TOT. PAY" or "TOTAL PAY" column lists, for each bonus game outcome, the product of the "WEIGHT" value and the "PAY" value. The bonus pay schedules are generally stored in the memory 28 of the gaming machine 10 along with other gaming machine operating programs and control parameters. A bonus game payout percentage per credit and a total game payout percentage per credit are shown on each of the five bonus pay schedules.

In one embodiment, the processor 26 selects one of the pay schedules set forth in FIGS. 6*a*–6*e*. Each of the bonus pay schedules corresponds to a predetermined wager amount ranging from a minimum wager to a maximum wager. For example, as shown in FIGS. 6*a* and 6*e*, the minimum wager is one credit and the maximum wager is twenty-five credits. The bonus pay schedules in FIGS. 6*a*–6*e* correspond to successive wager amount ranges of 1–5, 6–10, 11–15, 16–20, and 21–25 credits, respectively. The invention is not intended to be limited to such and the ranges are only for illustrative purposes. the processor 26 will select the bonus pay schedule that corresponds to the amount wagered or number of credits played on one game. For example, if the player chooses to wager 2 credits on 3 paylines for a wager amount of 6 credits (2×3), the bonus pay schedule corresponding to wager amount range of 6–10 credits shown in FIG. 6*b* will be selected by the processor 26.

Also, each of the bonus pay schedules has a respective bonus game payout percentage per credit such that successive bonus pay schedules shown in FIGS. 6*a*–6*e* corresponding to successively increasing, predetermined ranges for the wager amount have increasing, predetermined bonus game payout percentages per credit. For example, the bonus game payout percentage per credit (13.95%) of the bonus pay schedule in FIG. 6*e* corresponding to a wager amount in the range of 21–25 credits is greater than the bonus game payout percentage per credit (12.67%) of the bonus pay schedule in FIG. 6*d* corresponding to a wager amount in the range of 16–20 credits, which is greater than the bonus game payout percentage per credit (11.94%) of the bonus pay schedule shown in FIG. 6*c* corresponding to a wager amount in the range of 11–15 credits, which is greater than the bonus game payout percentage per credit (11.03%) of the pay schedule shown in FIG. 6*b* corresponding to a wager amount in the range of 6–10 credits, which is greater than the bonus game payout percentage per credit (10.17%) of the pay schedule shown in FIG. 6*a* corresponding to a wager amount in the range of 1–5 credits. Increasing the bonus game payout percentage per credit with a predetermined increase in wager amount increases the total game payout percentage. This is accomplished by keeping the basic game payout percentage per credit constant. Increasing the bonus game payout percentage per credit while keeping the basic game payout percentage per credit substantially constant is graphically illustrated in FIG. 7. In FIG. 7, there is shown a plot of a basic game payout percentage per credit and the total game payout percentage per credit versus the number of credits. Alternatively, the basic game payout percentage can be varied as well.

Increasing the bonus game payout percentage per credit is accomplished in different ways. For example, in one embodiment, as shown in FIGS. 6*a*–6*e* and graphically illustrated in FIG. 7, consecutive, predetermined increases in the wager amount result in an additional winning bonus game outcome being provided. For example, for the pay schedule shown in FIG. 6*a* corresponding to a wager amount of 1–5 credits, the possible winning bonus game outcomes are a tin can, a small fish, a medium fish, and a different medium fish. When 6–10 credits are wagered, the possible winning bonus game outcomes include an additional winning bonus game outcome, a large fish, in addition to the winning outcomes provided in the previous pay schedule shown in FIG. 6*a*. When 11–15 credits are wagered the pay schedule of FIG. 6*c* is selected, a very large fish becomes a possible winning game outcome; when 16–20 credits are wagered, a huge fish is added to the plurality of winning game outcomes of the previous pay schedule shown in FIG. 6*c*; and when 21–25 credits are wagered the pay schedule of FIG. 6*e* is selected and a gigantic fish is additionally included. While the consecutive bonus pay schedules are shown with additional winning bonus game outcomes that are ever larger fish, the invention is not intended to be limited to such and the additional winning bonus game outcomes for consecutive pay schedules, for example, can be different smaller fish or things as well.

As shown in FIGS. 6*a*–6*e*, the additional winning bonus game outcome of a consecutive bonus pay schedule has a pay value per credit greater than a maximum pay value per credit of the immediately preceding bonus pay schedule. For example, the associated pay value per credit of the additional winning bonus game outcome (huge fish) corresponding to the bonus pay schedule shown in FIG. 6*d* for wager amounts in the range of 16–20 credits is 75 credits which is greater than the associated pay value per credit of the maximum pay value (50 credits) of a winning bonus game outcome (very large fish) in the preceding bonus pay schedule shown in FIG. 6*c*. However, the invention is not intended to be limited to such and, for example, the maximum pay value per credit for the additional winning bonus game outcome need not be greater than the maximum pay value per credit of the immediately preceding bonus pay schedule.

A different embodiment for increasing the bonus game payout percentage per credit is shown in FIGS. 8*a*–8*e*. There is depicted another plurality of bonus pay schedules from which the processor 26 selects one corresponding to the wager amount.

The bonus pay schedules in FIGS. 8*a*–8*e* correspond to wager amount ranges of 1–5, 6–10, 11–15, 16–20 and 21–25 credits, respectively. The wager amount ranges and the number of bonus pay schedules are illustrative and are not intended to be limited to such. Also, each of the bonus pay schedules in FIGS. 8*a*–8*e* has a respective bonus game payout percentage per credit such that successive bonus pay schedules corresponding to successively increasing, predetermined ranges for the wager amount have increasing, predetermined bonus game payout percentages per credit.

In the embodiment depicted in FIGS. 8*a*–8*e*, the successive increase in the bonus game payout percentage per credit is achieved by varying the weight distribution of at least one bonus game winning outcome. A "WEIGHT" column indicates the weight distribution which represents the number of times the winning bonus game outcome can occur and the probability is indicated in a "PROB" or "PROBABILITY" column which indicates the various probabilities of hitting the respective winning bonus game outcomes. For example, the probability of catching a tin can is 0.216899(1666/7681) as shown in FIG. 8*a*.

In this embodiment, all of the possible bonus game winning outcomes are possible at every level of wager amount. For example, if the bonus game is a simulated fishing game, it is possible to "catch" the tin can, small fish, first medium fish second medium fish, large fish, very large fish, huge fish, and gigantic fish in every attempt. What varies with successive bonus pay schedules shown in FIGS. 8*a*–8*e*, for example, is the weight associated with at least one of the winning bonus game outcomes. Hence, the probability of achieving a certain winning bonus game outcome with successive bonus pay schedules varies as well such that the probability of at least one winning bonus game outcome increases with a predetermined increase in wager amount. For example, as shown in FIGS. 8*a* and 8*b*, the weights associated with achieving a medium fish, large fish, very large fish, huge fish, and gigantic fish are all increased from 800, 200, 10, 5, 1to 1200, 400, 30, 10, 2, respectively, in an immediately successive bonus pay schedule of FIG. 8*b* corresponding to a predetermined range of wager amounts of 6–10 credits. While it is shown that successive bonus pay schedules corresponding to predetermined increases in wager amounts have increases in the weight of at least one winning bonus game outcome, the weight associated with the winning bonus game outcomes whose weights are not increased, may be decreased to tailor the bonus game payout percentage per credit. Overall, the weight distribution is varied such that the bonus game payout percentage per credit increases with a predetermined increase in wager amount while the payout percentage per credit of the basic game remains substantially the same. For example, the bonus pay schedules of FIGS. 8*a*–8*e* corresponding to predetermined wager amounts of 1–5, 6–10, 11–15, 16–20, and 21–25 credits have corresponding, increasing bonus game payout percentages per credit of 11.05, 11.84, 12.46, 13.38, 14.04 percent respectively. The experienced player will immediately recognize the greater probability of catching larger fish that have greater associated pay values when more credits are wagered.

Another embodiment for increasing the bonus game payout percentage per credit is shown in FIGS. 9*a*–9*g*. There is depicted another plurality of bonus pay schedules from which the processor 26 selects one corresponding to the wager amount bet by the player. The bonus pay schedules shown in FIGS. 9*a*–9*g* correspond to wager amount ranges of 1–4, 5–7, 8–11, 12–14, 15–19, 20–24, and 25 credits, respectively. The wager amount ranges and the number of bonus pay schedules are illustrative and are not intended to be limited to such. Also, each of the bonus pay schedules has a respective bonus game payout percentage per credit such that successive bonus pay schedules in FIGS. 9*a*–9*g* corresponding to successively increasing, predetermined ranges for the wager amount have increasing, predetermined bonus game payout percentages per credit.

In the embodiment depicted in FIGS. 9*a*–9*g*, the successive increase in the bonus game payout percentage per credit is achieved by varying the pay value of at least one winning bonus game outcome with successive predetermined increases in wager amount. For example, pay values associated with the very large fish are 25, 35, 40, 50, 60, 70, and 79 for bonus pay schedules in FIGS. 9*a*–9*g* corresponding to successive increases in wager amounts of 1–4, 5–7, 8–11, 12–14, 15–19, 20–24, and 25 credits, respectively. As mentioned above, the "PAY" column lists the pay values of the respective winning bonus game outcomes. The "TOT PAY" or "TOTAL PAY" column lists, for each winning bonus game outcome, the product of the "WEIGHT" value and the "PAY" value. For the pay schedule in FIG. 9*a* corresponding to a wager amount range of 1–4 credits, the very large fish, for example, having a weight of 1000 and a pay value of 25, has a "TOTAL PAY" value of 25,000 credits. With the weight and probability of winning bonus game outcomes the same, the increase in "PAY" value in successive bonus pay schedules shown in FIGS. 9*a*–9*g* results in increases in the "TOTAL PAY" value and hence the bonus game payout percentage per credit. For example, the bonus game payout percentages associated with bonus pay schedules with wager amount ranges of 1–4, 5–7, 8–11, 12–14, 15–19, 20–24, and 25 credits, are 9.04, 9.98, 10.44, 11.38, 12.31, 13.24, and 14.09, respectively. These values are graphically illustrated in FIG. 10. The bonus pay schedules can be varied to tailor the bonus game payout percentage per credit and are not limited to the values shown in FIGS. 9*a*–9*g*.

Still referencing FIGS. 9*a*–9*g*, the successive increase in the bonus game payout percentage per credit is achieved by varying the pay value of only one winning bonus game outcome with successive predetermined increases in wager amount. Each pay schedule includes a maximum winning bonus game outcome with a maximum pay value that is greater than the pay values of the other winning bonus game outcomes in each bonus pay schedule. For example, in FIG. 9*a* the maximum winning bonus game outcome is a very large fish having a maximum pay value of 25 which is greater than the pay values (3, 5, 10, 15, 20) of the other winning bonus game outcomes (tin can, small fish, medium fish, different medium fish, large fish) in the pay schedule of FIG. 9*a*. As shown in FIGS. 9*a*–9*g* the bonus game payout percentage per credit increases with successive bonus pay schedules by varying the pay value of the maximum bonus game outcome alone.

While the present invention has been described with reference to one or more particular embodiments, those skilled in the art will recognize that many changes may be made thereto without departing from the spirit and scope of the present invention. While the invention is shown with respect to a reel-type slot machine for the basic game and a simulated fishing game for the bonus game, the present invention can be applied to other games as well. Each of these embodiments and obvious variations thereof is contemplated as falling within the spirit and scope of the claimed invention, which is set forth in the following claims.

What is claimed is:

1. A gaming machine comprising:

a basic game controlled by a processor in response to an initial wager amount, said initial wager amount being selectable in multiples called credits of a minimum wager to a maximum wager, said basic game having a basic game payout percentage and at least one start-bonus outcome; and a bonus game activated by said start-bonus outcome which causes said processor to shift operation from a basic game to a bonus game, said bonus game having a bonus game payout percentage that is variable with said initial wager amount such that said bonus game payout percentage changes in response to variations in said initial wager amount wherein an increase in the number of credits initially wagered yields an increase in the probable percentage of each credit wagered that is returned to a player by said bonus game.

2. The gaming machine of claim 1 wherein said gaming machine has a total game payout percentage based on said basic game payout percentage and said bonus game payout percentage, said total game payout percentage varying in response to variations in said initial wager amount.

3. The gaming machine of claim 1 wherein said bonus game payout percentage increases with a predetermined increase in said initial wager amount and decreases with a predetermined decrease in said initial wager amount.

4. The gaming machine of claim 1 further including a memory connected to said processor, a plurality of bonus pay schedules contained in said memory each having at least one winning bonus game outcome, each of said bonus pay schedules successively corresponding to a predetermined initial wager amount from said minimum wager to said maximum wager, each successive bonus pay schedule including at least one additional winning bonus game outcome.

5. The gaming machine of claim 4 wherein each of said winning bonus game outcomes has an associated pay value, said additional winning bonus game outcome having an associated pay value greater than said pay values of said other winning bonus game outcomes in said bonus pay schedule.

6. The gaming machine of claim 1 further including a memory connected to said processor, a plurality of bonus pay schedules contained in said memory each having at least one winning bonus game outcome with an associated probability of achieving said winning bonus game outcome, each of said bonus pay schedules successively corresponding to a predetermined initial wager amount from said minimum wager to said maximum wager, said probability of at least one winning bonus game outcome varying such that said probability of at least one winning bonus game outcome changes with variations in said initial wager amount.

7. The gaming machine of claim 6 wherein said probability increases with a predetermined increase in said initial wager amount and decreases with a predetermined decrease in said initial wager amount.

8. The gaming machine of claim 1 further including a memory connected to said processor, a plurality of bonus pay schedules contained in said memory each having at least one winning bonus game outcome with an associated pay value, each of said bonus pay schedules successively corresponding to a predetermined initial wager amount from said minimum wager to said maximum wager, said pay value of at least one winning bonus game outcome varying such that said pay value changes in response to variations in said initial wager amount.

9. The gaming machine of claim 8 wherein said pay value of at least one winning bonus game outcome increases with a predetermined increase in initial wager amount and decreases with a predetermined decrease in initial wager amount.

10. The gaming machine of claim 8 wherein said winning bonus game outcomes of each bonus pay schedule include a maximum winning bonus game outcome, said maximum winning bonus game outcome having a maximum pay value, said maximum pay value being greater than said pay values of said other winning bonus game outcomes in said bonus pay schedule, said maximum pay value varying such that said maximum pay value changes in response to variations in said initial wager amount.

11. The gaming machine of claim 10 wherein said maximum pay value increases with a predetermined increase in initial wager amount and decreases with a predetermined decrease in initial wager amount.

12. The gaming machine of claim 1 wherein said basic game payout percentage is substantially constant.

13. The gaming machine of claim 1 wherein a probability of achieving said start-bonus outcome is substantially constant.

14. A method of operating a gaming machine under control of a processor comprising:

providing a basic game having at least one start-bonus outcome;

selecting an initial wager amount in multiples, called credits, of a minimum wager to a maximum wager;

placing said initial wager amount on said basic game;

playing said basic game;

providing a bonus game in response to said start-bonus outcome, said bonus game having a bonus game payout percentage that is variable with said initial wager amount such that said bonus game payout percentage changes in response to variations in said initial wager amount; and playing said bonus game wherein an increase in the number of credits initially wagered yields an increase in the probable percentage of each credit wagered that is returned to a player by said bonus game.

15. The method of claim 14 wherein said step of providing a bonus game includes:

providing a plurality of bonus pay schedules contained in a memory connected to said processor;

providing each bonus pay schedule with at least one winning bonus game outcome, each of said bonus pay schedules successively corresponding to a predetermined initial wager amount from said minimum wager to said maximum wager; and selecting a bonus pay schedule from said plurality of bonus pay schedules such that said selected bonus pay schedule corresponds to said initial wager amount.

16. The method of claim 15 wherein said step of providing a bonus game includes providing each successive bonus pay schedule with at least one additional winning bonus game outcome.

17. The method of claim 16 wherein said step of providing a bonus game includes providing each of said winning bonus game outcomes with a pay value; and wherein said step of providing each successive bonus pay schedule with at least one additional winning bonus game outcome further includes providing said additional winning bonus game outcome with an associated pay value greater than said pay values of said winning bonus game outcomes in said bonus pay schedule.

18. The method of claim 15 wherein said step of providing a bonus game further includes:

providing each winning bonus game outcome with an associated probability of achieving said winning bonus game outcome;

varying said probability of at least one winning bonus game outcome such that said probability of at least one winning bonus game outcome changes in response to said initial wager amount.

19. The method of claim 18 wherein said step of varying said probability includes increasing said probability with a predetermined increase in said initial wager amount and decreasing said probability with a predetermined decrease in said initial wager amount.

20. The method of claim 15 wherein said step of providing a bonus game includes:

providing each winning bonus game outcome with an associated pay value;

varying said pay value of at least one winning bonus game outcome such that said pay value changes in response to variations in said initial wager amount.

21. The method of claim 20 wherein said step of varying said pay value includes increasing said pay value with a predetermined increase in said initial wager amount and decreasing said pay value with a predetermined decrease in said initial wager amount.

22. The method of claim 20 wherein said step of providing a bonus game includes:

providing each bonus pay schedule with a maximum winning bonus game outcome; and providing said maximum winning bonus game outcome with a maximum pay value greater than said pay values of said other winning bonus game outcomes in said pay schedule; and wherein said step of varying said pay value of at least one winning bonus game outcome such that said pay value changes in response to variations in said initial wager amount further includes varying only said maximum pay value such that said maximum pay value changes with variations in said initial wager amount.

23. The method of claim 22 wherein said step of varying said maximum pay value includes increasing said maximum pay value with a predetermined increase in said initial wager amount and decreasing said maximum pay value with a predetermined decrease in said initial wager amount.

24. The method of claim 14 wherein said basic game includes a basic game payout percentage.

25. The method of claim 24 wherein said basic game payout percentage is maintained substantially constant.

26. The method of claim 14 wherein a probability of achieving said start-bonus outcome is maintained substantially constant.

27. The method of claim 14 wherein said basic game includes a total game payout percentage; said total game payout percentage changing in response to variations in said initial wager amount.

* * * * *

US006155925C1

(12) REEXAMINATION CERTIFICATE (4701st)

United States Patent

Giobbi et al.

(10) Number: US 6,155,925 C1

(45) Certificate Issued: Dec. 31, 2002

(54) BONUS GAME FOR GAMING MACHINE WITH PAYOUT PERCENTAGE VARYING AS FUNCTION OF WAGER

(75) Inventors: John J. Giobbi, Crown Point, IN (US); Joel R. Jaffe, Evanston, IL (US)

(73) Assignee: WMS Gaming Inc., Chicago, IL (US)

Reexamination Request:
No. 90/005,929, Feb. 16, 2001

Reexamination Certificate for:

| | |
|---|---|
| Patent No.: | **6,155,925** |
| Issued: | **Dec. 5, 2000** |
| Appl. No.: | **09/373,151** |
| Filed: | **Aug. 12, 1999** |

(51) Int. Cl.$^{7}$ .................................................. A63F 13/00

(52) U.S. Cl. ................... 463/20; 273/138.1; 273/143 R

(58) Field of Search ................................ 273/292, 274, 273/138.1, 138.2, 139, 143 R; 463/20, 21, 29, 16, 17

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |
| 4,991,848 | A | 2/1991 | Greenwood et al. | 273/143 R |
| 5,123,649 | A | 6/1992 | Tiberio | 273/143 R |
| 5,342,049 | A | 8/1994 | Wichinsky et al. | 273/119 R |
| 5,494,287 | A | 2/1996 | Manz | 273/143 R |
| 5,542,669 | A | 8/1996 | Charron et al. | 463/13 |
| 5,544,892 | A | 8/1996 | Breeding | 273/292 |
| 5,570,885 | A | 11/1996 | Ornstein | 463/27 |
| 5,718,431 | A | 2/1998 | Ornstein | 273/292 |
| 5,743,800 | A | 4/1998 | Huard et al. | 463/26 |
| 5,823,874 | A | 10/1998 | Adams | 463/17 |
| 5,848,932 | A | 12/1998 | Adams | 463/20 |
| 5,851,148 | A | 12/1998 | Brune et al. | 463/25 |
| 5,890,962 | A | 4/1999 | Takemoto | 463/20 |
| 5,951,397 | A | 9/1999 | Dickinson | 463/36 |
| 5,976,015 | A | 11/1999 | Seelig et al. | 463/6 |
| 5,989,121 | A | 11/1999 | Sakamoto | 463/20 |
| 5,997,400 | A | 12/1999 | Seelig et al. | 463/6 |
| 6,190,255 | B1 * | 2/2001 | Thomas et al. | |

FOREIGN PATENT DOCUMENTS

| | | | |
|---|---|---|---|
| DE | 195 15 983 | 11/1996 | G07F/17/34 |
| EP | 0 521 599 | 1/1993 | G07F/17/34 |
| EP | 0 687 489 | 12/1995 | A63F/5/04 |
| EP | 0 874 337 | 10/1998 | G07F/17/32 |
| EP | 0 945 837 | 9/1999 | G07F/17/32 |
| GB | 2 072 395 | 5/1984 | G07F/17/34 |
| GB | 2 152 262 | 7/1985 | G07F/17/34 |
| GB | 2 181 589 | 4/1987 | G07F/17/34 |
| GB | 2 204 436 | 11/1988 | G07F/17/34 |
| GB | 2 262 642 | 6/1993 | G07F/17/34 |

OTHER PUBLICATIONS

Strow, David, *Anchor Chief Fears "Strike It Rich" May Sour Players*, Las Vegas Sun (internet), 4 pages (Aug. 16, 1999).

* cited by examiner

*Primary Examiner*—Benjamin Layno

(57) ABSTRACT

A gaming machine for playing a basic game and bonus game is set forth. The basic game is generated by a processor in response to a wager amount selected in multiples, called credits, of a minimum wager up to a maximum wager. The basic game includes a basic game pay schedule and at least one start-bonus outcome. The bonus game is entered upon the occurrence of a start-bonus outcome in the basic game. The bonus game has a bonus game payout percentage that is variable with the wager amount such that the bonus game payout percentage changes in response to variations in the wager amount.

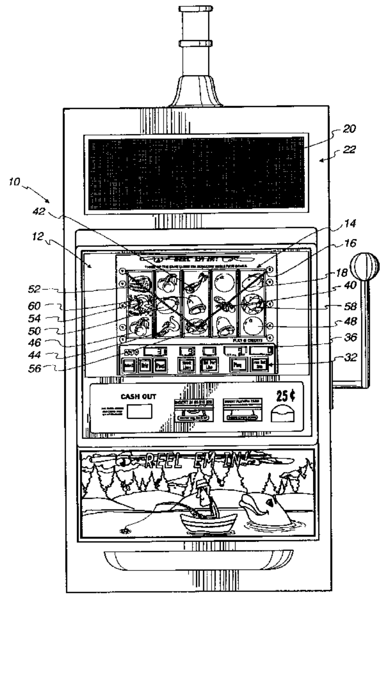

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–27 is confirmed.

* * * * *